(12) United States Patent
Porwal

(10) Patent No.: US 9,381,431 B2
(45) Date of Patent: Jul. 5, 2016

(54) PROPERTY ALTERATION OF A THREE DIMENSIONAL STEREOSCOPIC SYSTEM

(75) Inventor: Gunjan Porwal, Clementi (SG)

(73) Assignee: AUTODESK, Inc., San Rafael, CA (US)

( * ) Notice: Subject to any disclaimer, the term of this patent is extended or adjusted under 35 U.S.C. 154(b) by 507 days.

(21) Appl. No.: 13/312,891

(22) Filed: Dec. 6, 2011

(65) Prior Publication Data

US 2013/0141422 A1    Jun. 6, 2013

(51) Int. Cl.
*G06T 15/00* (2011.01)
*A63F 13/40* (2014.01)
*H04N 13/00* (2006.01)

(52) U.S. Cl.
CPC ............ *A63F 13/10* (2013.01); *H04N 13/0011* (2013.01); *H04N 13/0022* (2013.01); *H04N 13/0037* (2013.01); *H04N 13/0062* (2013.01); *A63F 2300/30* (2013.01); *A63F 2300/609* (2013.01); *A63F 2300/65* (2013.01)

(58) Field of Classification Search
CPC ..... G06T 19/00; G06T 15/005; G06T 11/001; G06T 17/20; G06T 17/00
USPC .................................................. 345/419, 418
See application file for complete search history.

(56) References Cited

U.S. PATENT DOCUMENTS

| | | | | |
|---|---|---|---|---|
| 6,104,402 | A  * | 8/2000 | Goddard et al. | 345/419 |
| 6,729,954 | B2 * | 5/2004 | Atsumi et al. | 463/7 |
| 2006/0192776 | A1 * | 8/2006 | Nomura et al. | 345/419 |
| 2010/0302138 | A1 * | 12/2010 | Poot et al. | 345/156 |
| 2011/0173567 | A1 * | 7/2011 | Sasaki et al. | 715/810 |
| 2012/0007855 | A1 * | 1/2012 | Noh et al. | 345/419 |
| 2012/0086714 | A1 * | 4/2012 | Yeon et al. | 345/419 |

* cited by examiner

*Primary Examiner* — James A Thompson
*Assistant Examiner* — Tapas Mazumder
(74) *Attorney, Agent, or Firm* — Artegis Law Group, LLP

(57) ABSTRACT

A system and method for altering a property associated with a three dimensional stereoscopic system that has a display are disclosed. The method includes determining that a portion of a virtual object in a three dimensional image generated by the display resides at a predetermined position along a first axis relative to the display based on a difference between a left eye image of the portion of the virtual object and a right eye image of the portion of the virtual object. The first axis is perpendicular to a plane of the display. The method further includes altering a property associated with the portion of the virtual object based on the predetermined position without referring to any perceived overlap between the virtual object and the tangible environment.

23 Claims, 4 Drawing Sheets

PROPERTY ALTERATION OF A THREE DIMENSIONAL STEREOSCOPIC SYSTEM

BACKGROUND OF THE INVENTION

1. Field of the Invention

The invention relates generally to three dimensional technologies and, more specifically, to property alteration of a three dimensional stereoscopic system.

2. Description of the Related Art

A conventional 3D stereoscopic display system may consistently present an object in a 3D scene with a selected property, such as color, weight, or another property. The conventional 3D stereoscopic display system may cause a simulated 3D object to be affected by real 3D structures that are in the perceived 3D scene. For example, the conventional 3D system may cause a virtual 3D ball to bounce off a real couch that is perceived to be in the path of the virtual 3D ball. However, the selected property of the virtual 3D ball may still remain consistent. Visualization of or interaction with the object may therefore be limited by the consistency of the property. Accordingly, improvements may be made with respect to the conventional 3D stereoscopic display system.

SUMMARY OF THE INVENTION

One example embodiment of the present invention sets forth a method for altering a property associated with a three dimensional stereoscopic system that has a display. The method includes determining that a portion of a virtual object in a three dimensional image generated by the display resides at a predetermined position along a first axis relative to the display based on a difference between a left eye image of the portion of the virtual object and a right eye image of the portion of the virtual object. The first axis is perpendicular to a plane of the display. The method further includes altering a property associated with the portion of the virtual object based on the predetermined position without referring to any perceived overlap between the virtual object and the tangible environment.

Another example embodiment of the present invention sets forth a computer readable storage medium containing a program which, when executed, performs an operation for altering a property associated with a three dimensional stereoscopic system that has a display are disclosed. The operation includes determining that a portion of a virtual object in a three dimensional image generated by the display resides at a predetermined position along a first axis relative to the display based on a difference between a left eye image of the portion of the virtual object and a right eye image of the portion of the virtual object. The first axis is perpendicular to a plane of the display. The operation further includes altering a property associated with the portion of the virtual object based on the predetermined position without referring to any perceived overlap between the virtual object and the tangible environment.

Yet another example embodiment of the present invention sets forth a system for altering a property associated with a three dimensional stereoscopic system that has a display. The system includes a memory and a processor. The processor is coupled to the memory and is configured to determine that a portion of a virtual object in a three dimensional image generated by the display resides at a predetermined position along a first axis relative to the display based on a difference between a left eye image of the portion of the virtual object and a right eye image of the portion of the virtual object. The first axis is perpendicular to a plane of the display. The processor is further configured to alter a property associated with the portion of the virtual object based on the predetermined position without referring to any perceived overlap between the virtual object and the tangible environment.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
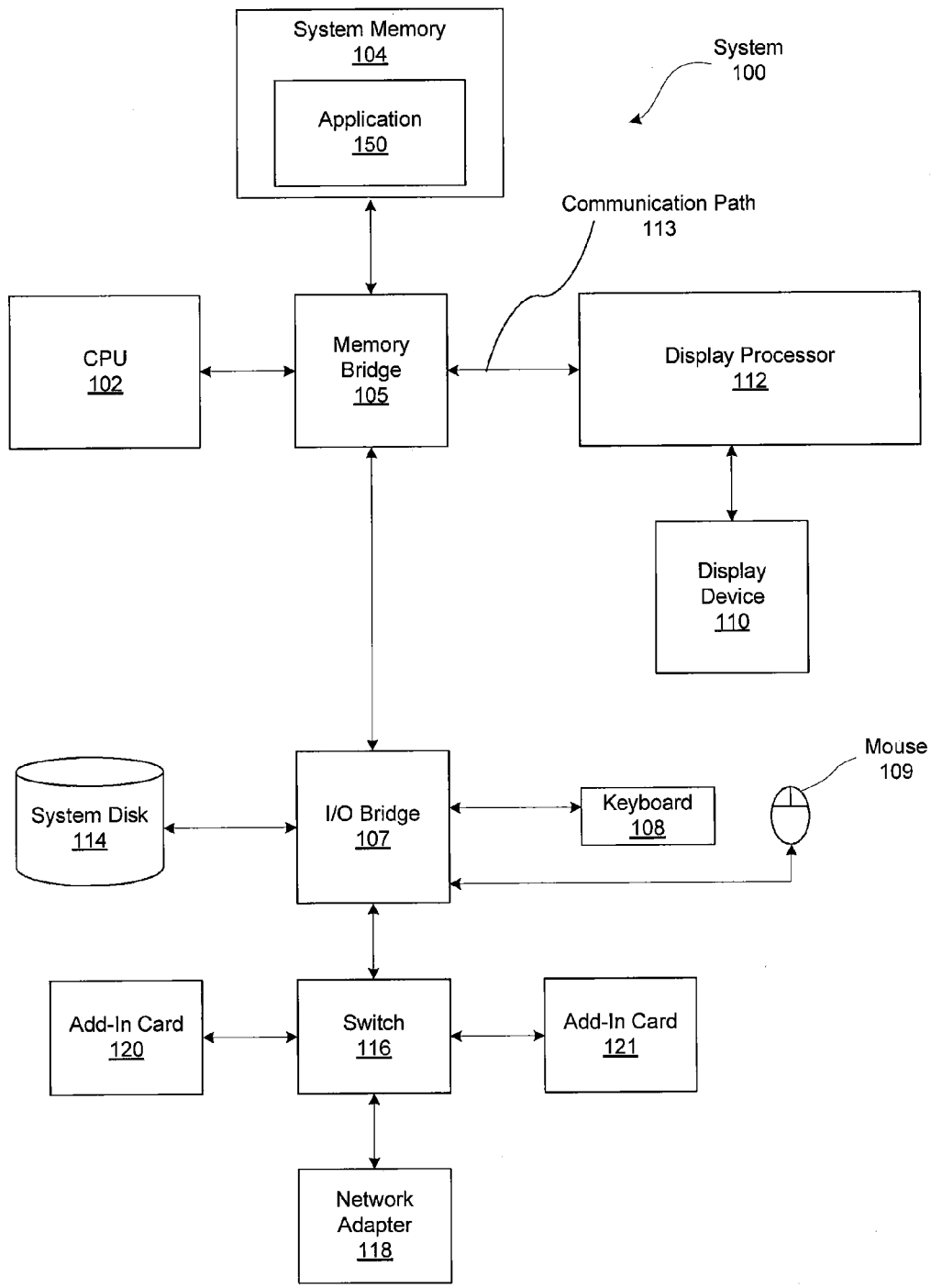
FIG. 1 is a block diagram of a system configured to implement one or more aspects of the present invention.

FIG. 1 is a block diagram of a system 100 configured to implement one or more aspects of the present invention. System 100 may be a computer workstation, personal computer, mobile device, tablet, or any other device suitable for practicing one or more embodiments of the present invention. As shown, system 100 includes one or more processing units, such as central processing unit (CPU) 102, and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown).

One or more display processors, such as display processor 112, are coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. Display processor 112 periodically delivers pixels to a display device 110 that may be any conventional CRT or LED monitor. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or a graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

In one embodiment, application 150 is stored in system memory 104. Application 150 may be any application configured to display a graphical user interface (GUI) on display device 110. Application 150 may be configured to generate and modify documents based on input received from a user. For example, application 150 may be a word processing application or an image editing program.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Figure 2:
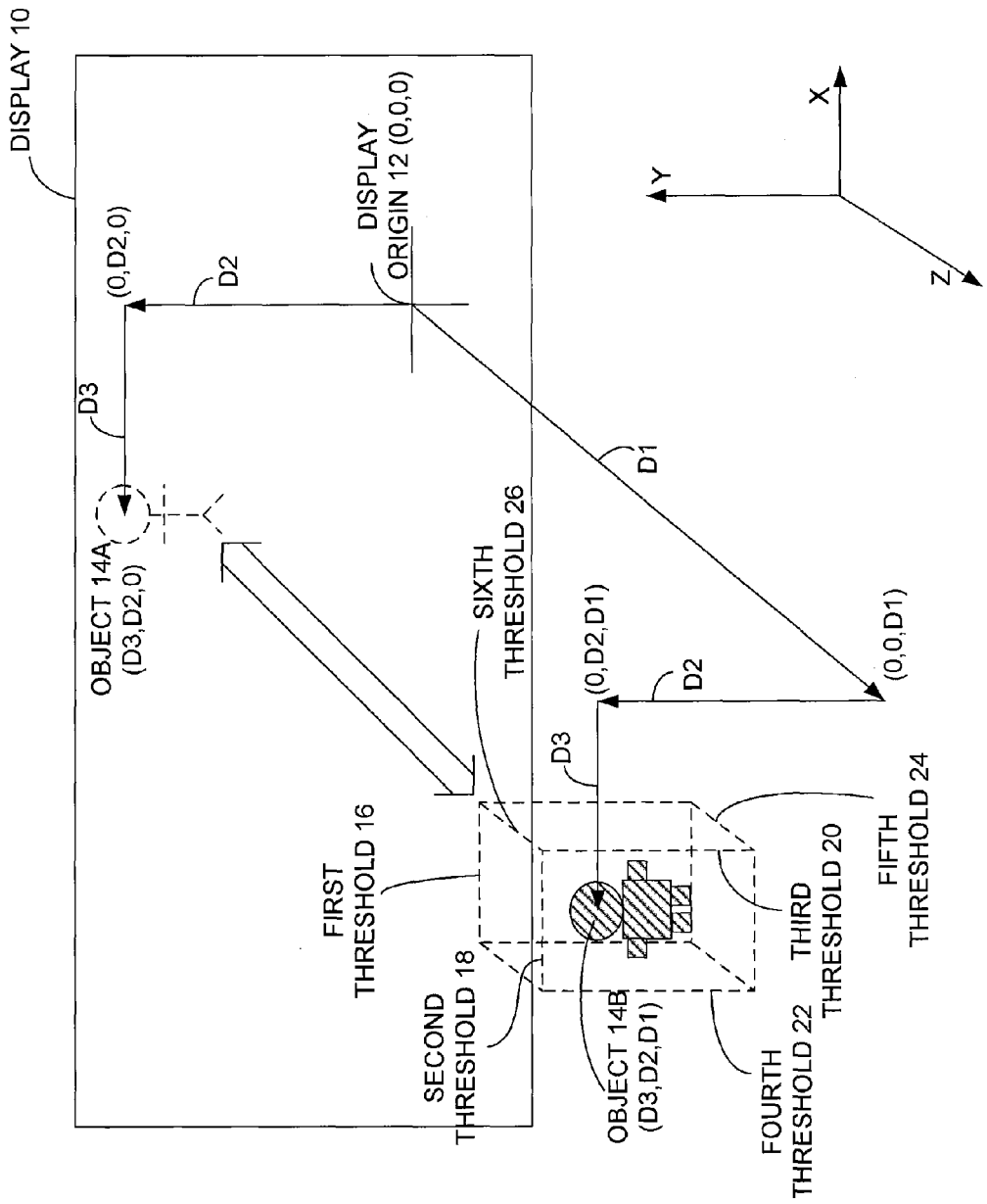
FIG. 2 illustrates alteration of a property of an object that transitions from one region of a 3D scene to another, according to one embodiment of the present invention.

FIG. 2 illustrates alteration of a property of an object that transitions from one region of a 3D scene to another, according to one embodiment of the present invention. FIG. 2 includes a display 10 of a 3D stereoscopic system (not shown), a display origin 12, and an object 14 that may be located at a first location as object 14A or a second location as object 14B. FIG. 2 further includes a first threshold 16, a second threshold 18, a third threshold 20, a fourth threshold 22, a fifth threshold 24, and a sixth threshold 26. FIG. 2 further includes vectors D1, D2, and D3 that are aligned along the Z, Y, and X axes, respectively. The object 14 may be a virtual object or character.

In an embodiment, the display 10 may be used for a computer aided design (CAD) program, a game, or any other 3D visualization purpose. The display 10 may be used to generate a 3D scene with a 3D coordinate system, with X and Y axes being parallel to a surface (or a plane) of the display 10, and a Z axis being particular to the surface of the display 10 and representing depth information.

The 3D scene that is displayed by the 3D stereoscopic system may be visualized as a 3D scene in front of and/or behind a window, relative to a viewer's position. Objects 14 appearing in the display 10 may be seen as 2D or background images, or the objects 14 may be seen as being 3D images that are closer or farther from the viewer than the surface of the display 10. Objects 14 that are seen as being closer to the viewer than the display 10 may be perceived as being in the same real 3D space with the physical display 10 and the viewer, such as being in the same room. The depth (e.g., a distance measured along the Z axis) at which a 3D image of an object 14 is generated by the 3D display system should correspond to a Z axis position determined by the 3D display system. The depth at which the 3D image of the object 14 is perceived to be located relative to the display 10 may be affected by an individual viewer's perception of the 3D image of the object 14.

In the embodiment, the 3D depth effect may be caused by a difference between left and right eye images, with the amount of difference between the left and right eye images determining the extent of the 3D depth effect. Zero difference between the images may correspond to a 2D image, or an image that is at the same level of depth as the surface of the display 10. The difference between the images may result in a perceived positive or negative depth relative to the surface of the display 10 (e.g., as being closer or farther relative to the viewer than the display 10). The two images may represent two perspectives of the same object, with a deviation equal to the perspectives that both eyes naturally receive in binocular vision, thus creating the illusion of a 3D image.

The amount of difference between the left and right eye images may correspond to a Z axis in a 3D frame of reference of the 3D display system that generates a 3D scene with the display 10, with X and Y axes representing a lateral or vertical position, respectively, relative to the display 10. In one implementation, the display 10 may be mounted on a vertical surface such as a wall of a room. However, other orientations of the display 10 may also be possible, such as being placed on a table, or at an angle on a vehicle dashboard.

In an embodiment of the invention, an image of an object 14, such as a ball, a videogame character, a structure in a 3D CAD display, or another virtual object, may be generated by the display 10. The 3D image of the object 14 may be at a first position relative to the display 10 (e.g., farther from a viewer than a surface of the display 10), at a second position relative to the display 10 (e.g., at the surface of the display 10, which may correspond to the presentation of a 2D image due to the lack of differences between left and right eye images of the object 14), or at a third position relative to the display 10 (e.g., in front of the surface of the display 10 or closer to the viewer than the surface of the display 10). The object 14 may be moved between these positions.

In an embodiment, at a predetermined position, a property of the object 14 may be altered without reference to either a perceived contact or an overlap in position of the object 14 with a tangible environment in which the display 10 is in. The tangible environment of the display 10 may include physical objects that may be touched, such as a floor, a ceiling, furniture, or people. The predetermined position may be included in a region at or beyond a boundary, such as the first threshold 16. The first threshold 16 may be defined by a position along the Z-axis, such as a depth level relative to the surface of the display 10. The depth level may be at any position along the Z-axis, such as at the surface of the display 10, at a depth within the display 10, or at a depth in front of the display 10 (e.g., closer to a viewer than the display 10). The predetermined position may be located in a region that is between the first threshold 16 and the second threshold 18. The second threshold 18 may likewise be defined by a position along the Z-axis.

The perceived contact or overlap in position may be a viewer's impression of contact or overlap between the object 14 and the tangible environment. For example the object 14 may be a virtual ball that is projected to a coordinate in a virtual 3D space that is occupied or in proximity to a physical couch that is present in a room where the virtual 3D space is perceived to appear. Contact or overlap may be perceived based on a user's perception of the virtual 3D space and the object 14, the viewer's position, and the structures making up the tangible environment. Regardless of any perceived contact or overlap, the property of the object 14 may be altered. Any occurrence or nonoccurrence of either contact or overlap in position between the object 14 and the tangible environment may be disregarded in the determination of whether to alter the property.

The predetermined position may further reside within a region at or beyond a boundary such as the third threshold 20 or the fourth threshold 22, which are each defined by a position along the X-axis. The region may be between the third threshold 20 and the fourth threshold 22. The predetermined position may also be reside within a region at or beyond the fifth threshold 24 or the sixth threshold 26, which are defined by a position along the Y-axis. The region may be between the fifth threshold 24 and the sixth threshold 26.

From the perspective of a viewer, a single boundary defined by a location on the Z-axis may divide the 3D scene into a front and back portion. Similarly, from a viewer perspective, a single boundary defined by an X-axis location may divide the 3D scene into a left and right portion, and a Y-axis defined boundary might divide the scene into a top and bottom portion. Where multiple boundaries apply, the scene may be further subdivided.

The property that is altered may be one or more of an image characteristic, a behavioral characteristic, and a physical characteristic. The image characteristic may be one or both of brightness and a color. The behavioral characteristic may be one or more of an aggression level of a video game character and an intelligence level of a video game character. The physical characteristic may be one or more of strength, speed, size, shape, toughness, endurance, mass, weight, inertia, and resilience.

With respect to the image characteristic, in the case of a boundary threshold along the Z-axis, if the object 14 such as a ball begins to move over the boundary threshold, a property of a portion of the ball may be altered. For example, the portion of the ball that has crossed over the threshold may be made brighter, or changed to a different color. If the threshold is at the level of the surface of the display 10, the part of each affected 3D image that extends out of the surface of the display 10 towards a viewer may be given a new color or be made brighter. If the change in property is limited to a region, such as between the first threshold 16 and the second threshold 18, the part of each affected 3D image that extends between the first threshold 16 and the second threshold 18 that extends between the two boundaries may be altered. Alternatively, if any part of the object 14 is in the region, the affected property for the entire object 14 may be altered. As shown in FIG. 2, the object 14A at coordinates (D3,D2,0) may be altered in color as compared to the object 14B at coordinates (D3,D2,D1), which is between the first threshold 16 and the second threshold 18.

Other properties, such as the behavioral characteristic or the physical characteristic may likewise be affected by one or more of the first through sixth thresholds 16, 18, 20, 22, 24, and 26. Any of the individual characteristics or properties may be affected in combination with each other. With respect to the physical properties that may be changed for an object 14 or character, the properties may vary widely. For example, as a video game character or 3D object is moved past a boundary, the one or more physical characteristics of the video game character may be changed. The character may become stronger or faster, making it a more difficult opponent for a human user of the video game. Alternatively, a user controlled character may be made stronger or faster by crossing over the boundary. Other characteristics that may be affected include endurance, which may allow the character to run farther, or which may affect other game calculations.

Similarly, being in a region beyond a boundary or defined by boundaries may cause alteration of the mass, weight, inertia, or resilience of the object 14 (e.g., a character). For example, altering the mass, weight, or inertia of the character may affect how quickly the character can move, or how much effort is required to move the character. Changing the resilience of the object 14 may affect how high the object 14 bounces.

In an example embodiment, a ball (e.g., the object 14) may travel past a boundary into a region where its frictional coefficient is altered to become much higher. Simulated drag within the region may cause the ball to lose speed more quickly than before it entered the region. The ball may continue to travel through the region, and emerge outside of the region where its original coefficient of friction may be restored to its former level. Once outside the region, the ball may lose speed based on its original coefficient of friction, but continue traveling at a rate lower than it would have traveled at if it hadn't encountered the property altering region.

The property changed as a result of the portion of the object 14 being at a position may be an aggression or intelligence level of a video game character. In other words, in addition to or alternatively to making a video game character stronger or weaker, the algorithms used to direct a computer controlled video game character's actions may be adjusted to make the character more or less aggressive, and more or less capable of implementing strategy. Adjusting the character's aggression and/or intelligence may be analogous to adjusting a difficulty setting of the video game with respect to the particular affected character.

Figure 3:
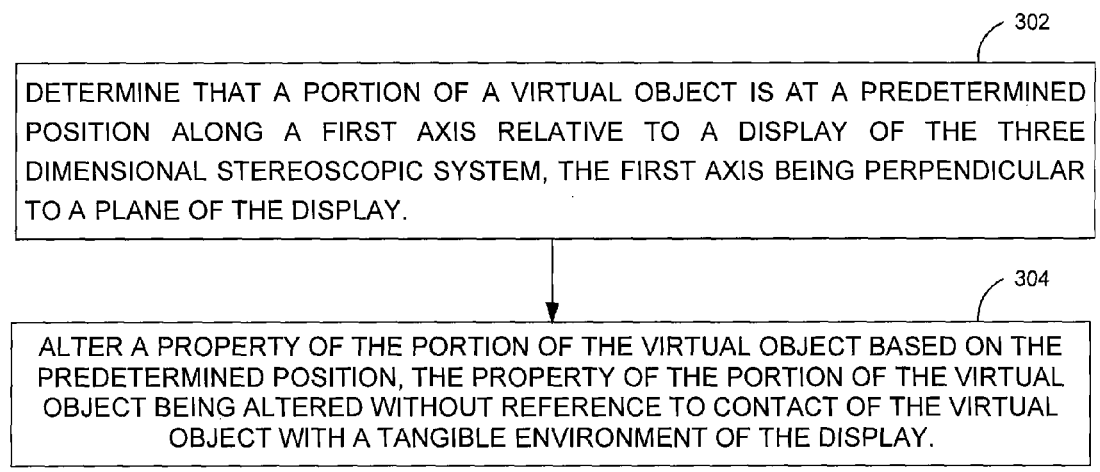
FIG. 3 is a flowchart of method steps for altering a property associated with a three dimensional stereoscopic system, according to one example embodiment of the present invention.

FIG. 3 is a flowchart of method steps for altering a property alteration associated with a three dimensional stereoscopic system, according to one example embodiment of the present invention. In operation 302, whether a portion of a virtual object is at a predetermined position along a first axis relative to a display of the three dimensional stereoscopic system is determined. The first axis is perpendicular to a plane of the display. The predetermined position may be in a region that is two or three dimensional, and that may be defined by one or more boundaries, such as a first threshold 16, a second threshold 18, a third threshold 20, a fourth threshold 22, a fifth threshold 24, and a sixth threshold 26. Determining whether the portion of the virtual object is at the predetermined position may be performed by monitoring one or more of the first through sixth thresholds 16, 18, 20, 22, 24, 26, to identify whether a portion of the virtual object has crossed into or out of the region. Alternatively, a coordinate of the portions of the virtual object may be monitored to determine whether they match or otherwise satisfy the limitations of the region as defined by its boundaries. Each of the applicable boundaries may be considered in turn to determine whether the portion of the virtual object is within the region.

In operation 304, a property of the portion of the virtual object is altered based on the predetermined position, the property of the portion of the virtual object being altered without reference to contact of the virtual object with a tangible environment of the display. The property of the virtual object may remain altered during the time that the portion of the virtual object remains at the predetermined position or within the region. The property of the virtual object may remain altered after it leaves the predetermined position or region, or the property of the virtual object may revert to its original state, or change to another state after leaving the predetermined position or region. In another embodiment, the virtual object may remain at a fixed location while one or more of the first through sixth thresholds 16, 18, 20, 22, 24, 26 are moved relative to the virtual object.

Figure 4:
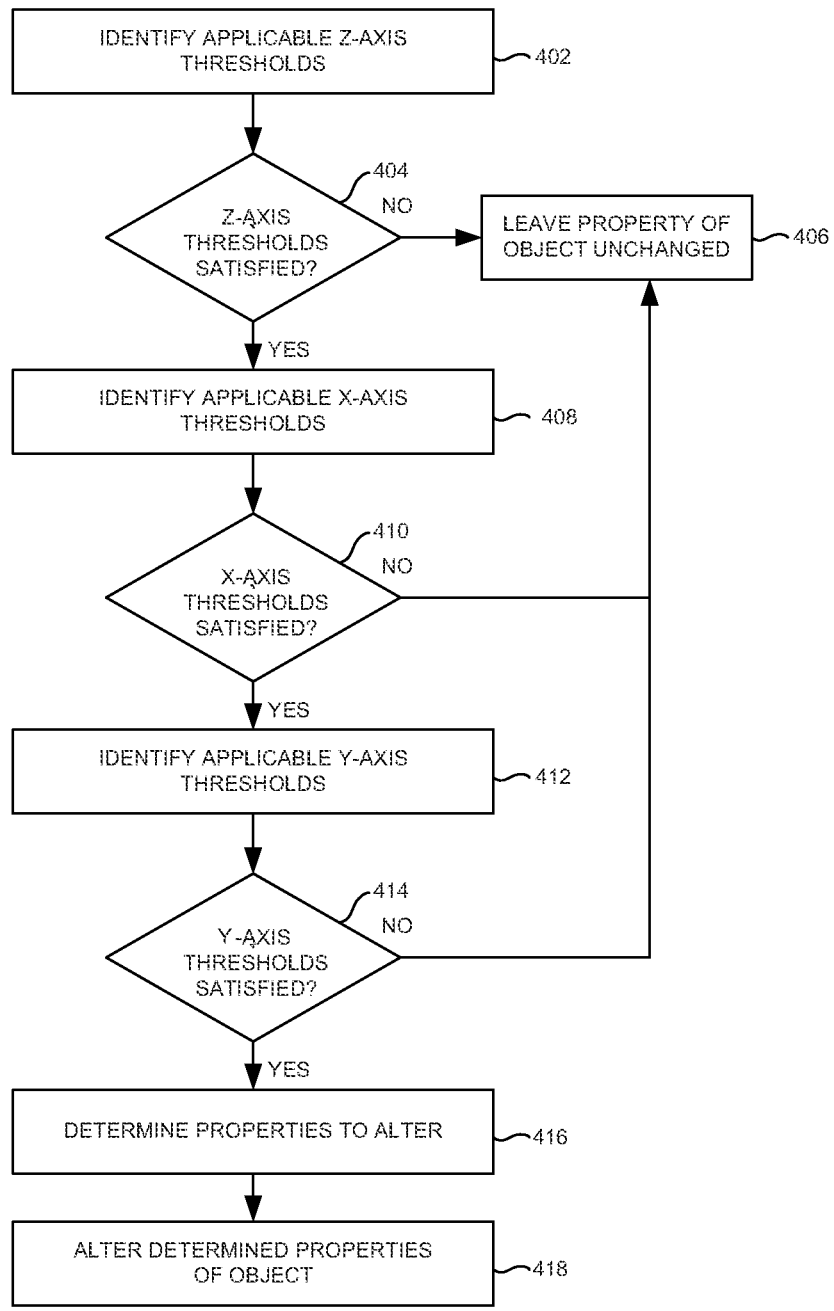
FIG. 4 is another flowchart of method steps for altering a property associated with a three dimensional stereoscopic system, according to one example embodiment of the present invention.

FIG. 4 is another flowchart of method steps for altering a property associated with a three dimensional stereoscopic system, according to one example embodiment of the present invention. In operation 402, applicable Z-axis thresholds are identified. For example, one or both of the first threshold 16 and the second threshold 18 may be identified as Z-axis thresholds. Property alteration may occur in either a region closer to or farther from the display 10 than either the first or second thresholds 16, 18. Alternatively, property alteration may occur in the region between the first and second thresholds 16, 18.

In operation 404, whether the Z-axis thresholds are satisfied is determined. If the Z-axis thresholds are not satisfied, operation 406 occurs, and the property is left unaltered. If the Z-axis thresholds are satisfied, operation 408 occurs.

In operation 408, applicable X-axis thresholds are identified. For example, one or both of the third threshold 20 and the fourth threshold 22 may be identified as X-axis thresholds. Property alteration may occur in either a region closer to or farther from the display origin 12 than either the third or fourth thresholds 20, 22. Alternatively, property alteration may occur in the region between the third and fourth thresholds 20, 22. After operation 408, operation 410 occurs.

In operation 410, whether the X-axis thresholds are satisfied is determined. If the X-axis thresholds are not satisfied, operation 406 occurs, and the property is left unaltered. If the X-axis thresholds are satisfied, operation 412 occurs.

In operation 412, applicable Y-axis thresholds are identified. For example, one or both of the fifth threshold 24 and the sixth threshold 26 may be identified as Y-axis thresholds. Property alteration may occur in either a region closer to or farther from the display origin 12 than either the fifth or sixth thresholds 24, 26. Alternatively, property alteration may occur in the region between the fifth and sixth thresholds 24, 26. After operation 412, operation 414 occurs.

In operation 414, whether the Y-axis thresholds are satisfied is determined. If the Y-axis thresholds are not satisfied, operation 406 occurs, and the property is left unaltered. If the Y-axis thresholds are satisfied, operation 416 occurs.

In operation 416, the properties to be altered are determined. For example, the property to be altered may be one or more of brightness, weight, strength, inertia, kinetic energy, a frictional coefficient, or any of the other above mentioned properties. After operation 416, operation 418 occurs.

In operation 418, the determined properties are altered. The properties may be altered based on the presence of the portion of the object 14 within the region that satisfies each of the applicable thresholds, or on the prior presence of the portion of the object 14 within the region. The property may remain changed, or may revert back to its prior state after the portion of the object 14 is no longer within the region. The property change may affect just the portion of the object 14, a different portion of the object 14 not present within the region, or the entire object 14.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method for altering a property associated with a three dimensional stereoscopic system that has a display, the method comprising:
    determining that one or more threshold distances included in a plurality of threshold distances have moved relative to a virtual object, wherein the one or more threshold distances define a region that includes a predetermined position;
    determining that a portion of a virtual object in a three dimensional image generated by the display resides at the predetermined position along a first axis relative to the display based on a difference between a left eye image of the portion of the virtual object and a right eye image of the portion of the virtual object, wherein the first axis is perpendicular to a plane of the display; and
    altering a property associated with the portion of the virtual object based on the predetermined position without referring to any overlap between a perceived position of the virtual object and an actual position of an object situated in a tangible environment in which the display is situated.

2. The method of claim 1, wherein the region is located beyond a first threshold distance included in the plurality of threshold distances relative to the display as measured along the first axis.

3. The method of claim 1, wherein the region is located between a first threshold distance included in the plurality of threshold distances relative to the display as measured along the first axis and a second threshold distance included in the plurality of threshold distances relative to the display as measured along the first axis.

4. The method of claim 1, wherein the display includes an origin, and the region is located between a third threshold distance included in the plurality of threshold distances relative to the origin as measured along a second axis that is parallel to the plane of the display and perpendicular to the first axis and a fourth threshold distance included in the plurality of threshold distances relative to the origin as measured along the second axis.

5. The method of claim 4, wherein the region is located between a fifth threshold distance included in the plurality of threshold distances relative to the origin along a third axis that is parallel to the plane of the display and perpendicular to the second and first axes and a sixth threshold distance included in the plurality of threshold distances relative to the origin along the third axis.

6. The method of claim 1, wherein the property associated with the portion of the virtual object comprises at least one of an image characteristic, a behavioral characteristic, and a physical characteristic.

7. The method of claim 6, wherein the image characteristic comprises at least one of brightness and a color.

8. The method of claim 6, wherein the behavioral characteristic comprises at least one of an aggression level associated with a video game character and an intelligence level associated with a video game character.

9. The method of claim 6, wherein the physical characteristic comprises at least one of strength, speed, size, shape, toughness, endurance, mass, weight, inertia, and resilience.

10. The method of claim 1, wherein the property associated with the portion of the virtual object is further associated with the entire virtual object.

11. The method of claim 1, wherein the display includes an origin, and altering the property associated with the portion of the virtual object comprises applying a function to the alteration based on the distance from the origin of the portion of the virtual object as measured along at least one of the first axis, a second axis that is parallel to the plane of the display and perpendicular to the first axis, and a third axis that is parallel to the plane of the display and perpendicular to the second and first axes.

12. A non-transitory computer-readable storage medium containing instructions for altering a property associated with a three dimensional stereoscopic system that has a display, which when executed by a processor, causes the processor to:
    determine that one or more threshold distances included in a plurality of threshold distances have moved relative to a virtual object, wherein the one or more threshold distances define a region that includes a predetermined position;
    determine that a portion of a virtual object in a three dimensional image generated by the display resides at the predetermined position along a first axis relative to the display based on a difference between a left eye image of the portion of the virtual object and a right eye image of the portion of the virtual object, wherein the first axis is perpendicular to a plane of the display; and
    alter a property associated with the portion of the virtual object based on the predetermined position without referring to any overlap between a perceived position of the virtual object and an actual position of an object situated in a tangible environment in which the display is situated.

13. The computer-readable storage medium of claim 12, wherein the region is located beyond a first threshold distance included in the plurality of threshold distances relative to the display as measured along the first axis.

14. The computer-readable storage medium of claim 12, wherein the region is located between a first threshold distance included in the plurality of threshold distances relative to the display as measured along the first axis and a second threshold distance included in the plurality of threshold distances relative to the display as measured along the first axis.

15. The computer-readable storage medium of claim 12, wherein the display includes an origin, and the region is located between a third threshold distance included in the plurality of threshold distances relative to the origin as measured along a second axis that is parallel to the plane of the display and perpendicular to the first axis and a fourth threshold distance included in the plurality of threshold distances relative to the origin as measured along the second axis.

16. The computer-readable storage medium of claim 15, wherein the region is located between a fifth threshold distance included in the plurality of threshold distances relative to the origin along a third axis that is parallel to the plane of the display and perpendicular to the second and first axes and a sixth threshold distance included in the plurality of threshold distances relative to the origin along the third axis.

17. The computer-readable storage medium of claim 12, wherein the property associated with the portion of the virtual object comprises at least one of an image characteristic, a behavioral characteristic, and a physical characteristic.

18. A system configured to alter a property associated with a three dimensional stereoscopic system that has a display, the system comprising:
   a memory; and
   a processor coupled to the memory and configured to:
      determine that one or more threshold distances included in a plurality of threshold distances have moved relative to a virtual object, wherein the one or more threshold distances define a region that includes a predetermined position;
      determine that a portion of a virtual object in a three dimensional image generated by the display resides at the predetermined position along a first axis relative to the display based on a difference between a left eye image of the portion of the virtual object and a right eye image of the portion of the virtual object, wherein the first axis is perpendicular to a plane of the display; and
      alter a property associated with the portion of the virtual object based on the predetermined position without referring to any overlap between a perceived position of the virtual object and an actual position of an object situated in a tangible environment in which the display is situated.

19. The system of claim 18, wherein the region is located beyond a first threshold distance included in the plurality of threshold distances relative to the display as measured along the first axis.

20. The system of claim 18, wherein the region is located between a first threshold distance included in the plurality of threshold distances relative to the display as measured along the first axis and a second threshold distance included in the plurality of threshold distances relative to the display as measured along the first axis.

21. The method of claim 3, wherein the one or more threshold distances that have moved relative to the virtual object include at least one of the first threshold distance and the second threshold distance.

22. The method of claim 4, wherein the one or more threshold distances that have moved relative to the virtual object include at least one of the first threshold distance and the second threshold distance.

23. The method of claim 5, wherein the one or more threshold distances that have moved relative to the virtual object include at least one of the first threshold distance and the second threshold distance.

* * * * *